US005673815A

United States Patent [19]

Dallman

[11] Patent Number: 5,673,815

[45] Date of Patent: Oct. 7, 1997

[54] MATERIAL DISPENSER

[76] Inventor: Ernest R. Dallman, 7654 William Penn Pl., Indianapolis, Ind. 46256

[21] Appl. No.: 529,434

[22] Filed: Sep. 18, 1995

[51] Int. Cl.$^6$ .............................. B65G 59/00

[52] U.S. Cl. .............................. 221/255; 221/271

[58] Field of Search .............................. 221/255, 271, 221/155, 191, 268, 283; 312/50, 61, 71, 183

[56] References Cited

U.S. PATENT DOCUMENTS

| | | | |
|---|---|---|---|
| 1,419,075 | 6/1922 | Prosser | 221/255 |
| 2,099,862 | 11/1937 | Miller | 221/271 |
| 2,119,912 | 6/1938 | Fuselier | 221/255 |
| 2,673,133 | 3/1954 | Koch | 221/271 |

FOREIGN PATENT DOCUMENTS

| | | | |
|---|---|---|---|
| 485376 | 10/1953 | Italy | 221/271 |

*Primary Examiner*—Kenneth Noland
*Attorney, Agent, or Firm*—Barnes & Thornburg

[57] ABSTRACT

A material dispenser includes a first panel for supporting pieces of material, and a second panel appended to the first panel. The second panel is formed to include a material-dispensing aperture to permit a piece of material to pass through the second panel. A material-dispensing plate is situated on the first panel and has a material-acquiring position and a material-dispensing position. The dispenser also includes a ledge appended to the material-dispensing plate and situated under the material when the material-dispensing plate is in the material-dispensing position and behind the material when the material-dispensing plate is in the material-acquiring position. The dispenser further includes a push tab appended to the material-dispensing plate, and a spring appended to the material-dispensing plate so that when the push tab is pushed, the material-dispensing plate moves backward away from the second panel to its material-acquiring position to permit a bottom piece of material to fall down toward the first panel so that the piece of material is positioned between the ledge and second panel, and when the push tab is released the material-dispensing plate is biased forward by the spring toward the second panel so that the piece of material fixed between the ledge and second panel is pushed through the material-dispensing aperture formed in the second panel.

16 Claims, 4 Drawing Sheets

MATERIAL DISPENSER

BACKGROUND AND SUMMARY OF THE INVENTION

The present invention relates to a material dispenser for housing and dispensing materials when needed by a user. More particularly, the present invention relates to a material dispenser that operates by merely pushing on a push tab to activate a material-dispensing plate that acquires and then dispenses a piece of material.

One type of material dispenser is an envelope dispenser commonly seen near bank automatic teller machines and at other remote locations where envelopes are required. Conventional material dispensers require the use of a motor which adds cost to the installation of the material dispenser and requires that a source of power be available at the remote location where the material dispenser is located.

It would be advantageous to provide a material dispenser that is easy to operate and does not require the use of a motor. A non-motorized material dispenser would be less expensive to install and operate.

According to the present invention, a material dispenser is provided to house and dispense pieces of material. The material dispenser includes a first panel for supporting the material, a second panel appended to the first panel, and a material-dispensing plate for dispensing pieces of material through a material-dispensing aperture formed in the second panel. The material-dispensing plate is situated on the first panel and has a material-acquiring position and a material-dispensing position. A ledge is appended to the material-dispensing plate. In the material-dispensing position, the ledge is situated under the material and in the material-acquiring position, the ledge is situated under behind the material.

A push tab is appended to the material-dispensing plate. A spring is appended to the material-dispensing plate so that when the push tab is pushed, the material-dispensing plate moves backward away from the second panel to its material-acquiring position. The backward movement of the material-dispensing plate permits a bottom piece of material to fall down toward the first panel so that the piece of material is positioned between the ledge and second panel. When the push tab is released, the material-dispensing plate is biased forward by the spring toward the second panel. The forward movement of the material-dispensing plate causes the piece of material situated between the ledge and the second panel to move forward through the material-dispensing aperture formed in the second panel to permit the user to obtain the piece of material.

In a preferred embodiment of the present invention, the first panel is a bottom panel and the second panel is a front panel of a housing. The housing further includes a back panel appended to the bottom panel. The back panel is arranged to move with respect to the rest of the housing. This movable back panel permits a user to place materials within the housing so that the materials can be dispensed later.

Advantageously, a movable weight is mounted inside of the housing and situated above the materials held within the housing. The movable weight assists a piece of material in falling down toward the bottom panel when the user pushes the material-dispensing plate backward to acquire a piece of material in between the ledge and the front panel, so that upon release of the push tab, the piece of material will be dispensed through the aperture formed in the front panel.

In a preferred embodiment of the present invention, the material dispenser is used to dispense envelopes. The height of the ledge must be approximately equal to that of each envelope being housed and dispensed. In addition, the height of the ledge may be set so that the material dispenser dispenses one or more envelopes or other type of material each time the push tab is pushed by a user.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
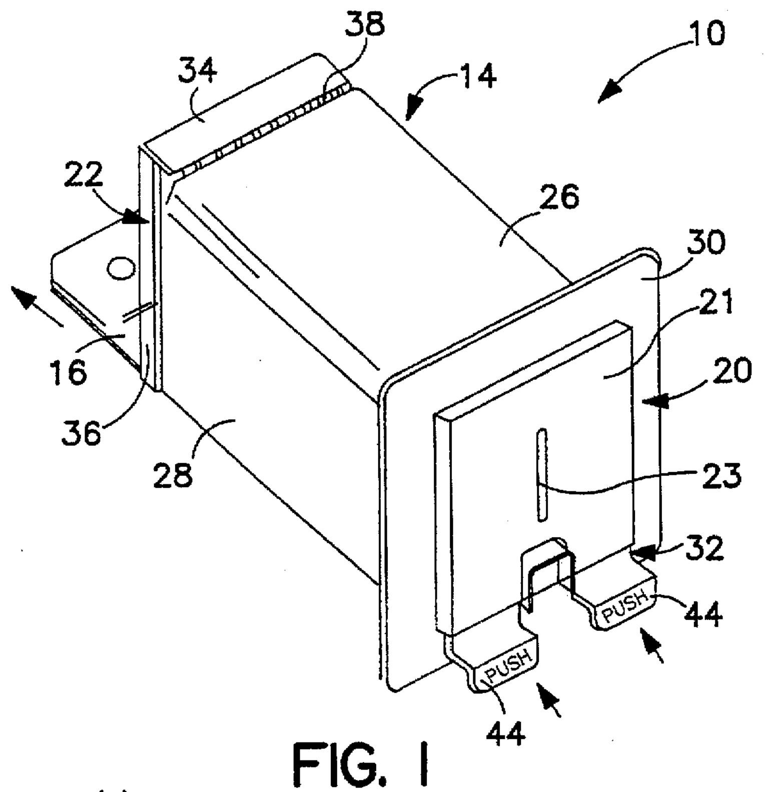
FIG. 1 is a perspective view of the present invention showing the housing used to hold materials and a front panel of the housing though which the materials are dispensed.
Figure 3:
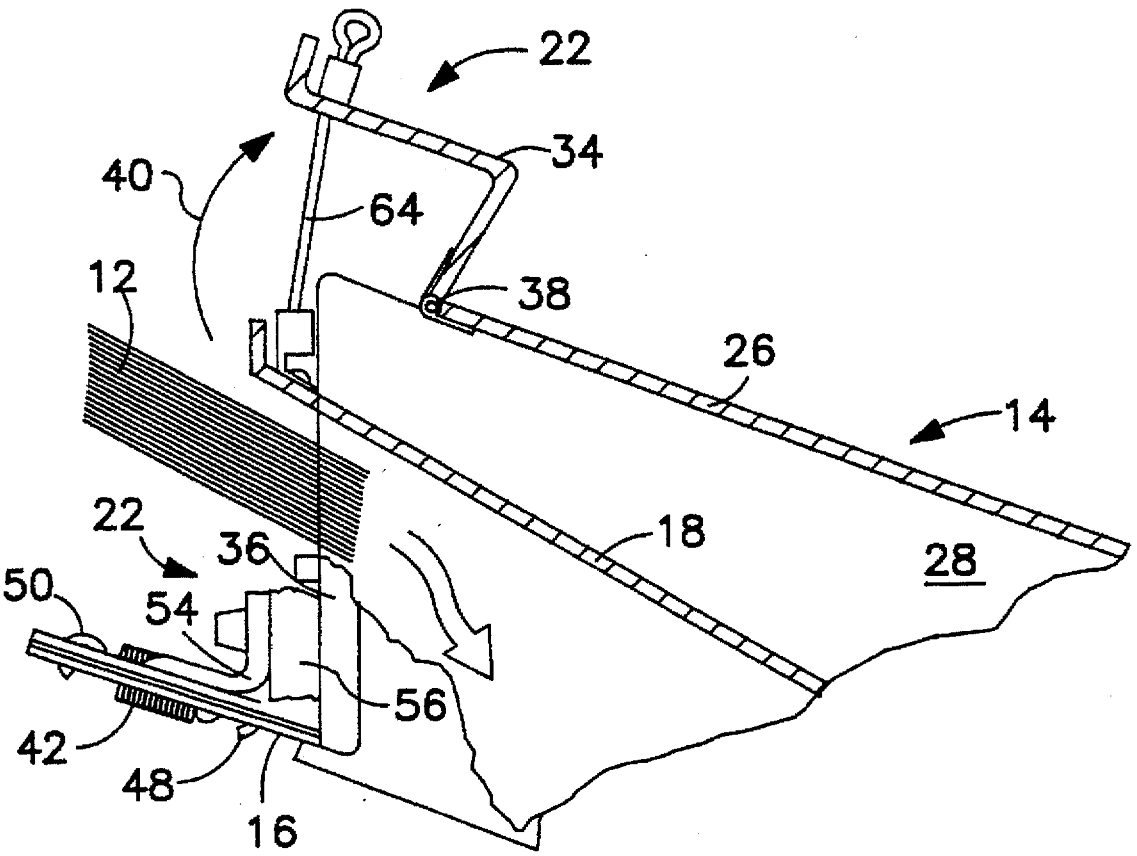
FIG. 3 is a partial transverse sectional view of the present invention showing a back panel of the housing being lifted up to allow access into the housing so the materials may be placed within the housing.
Figure 4:
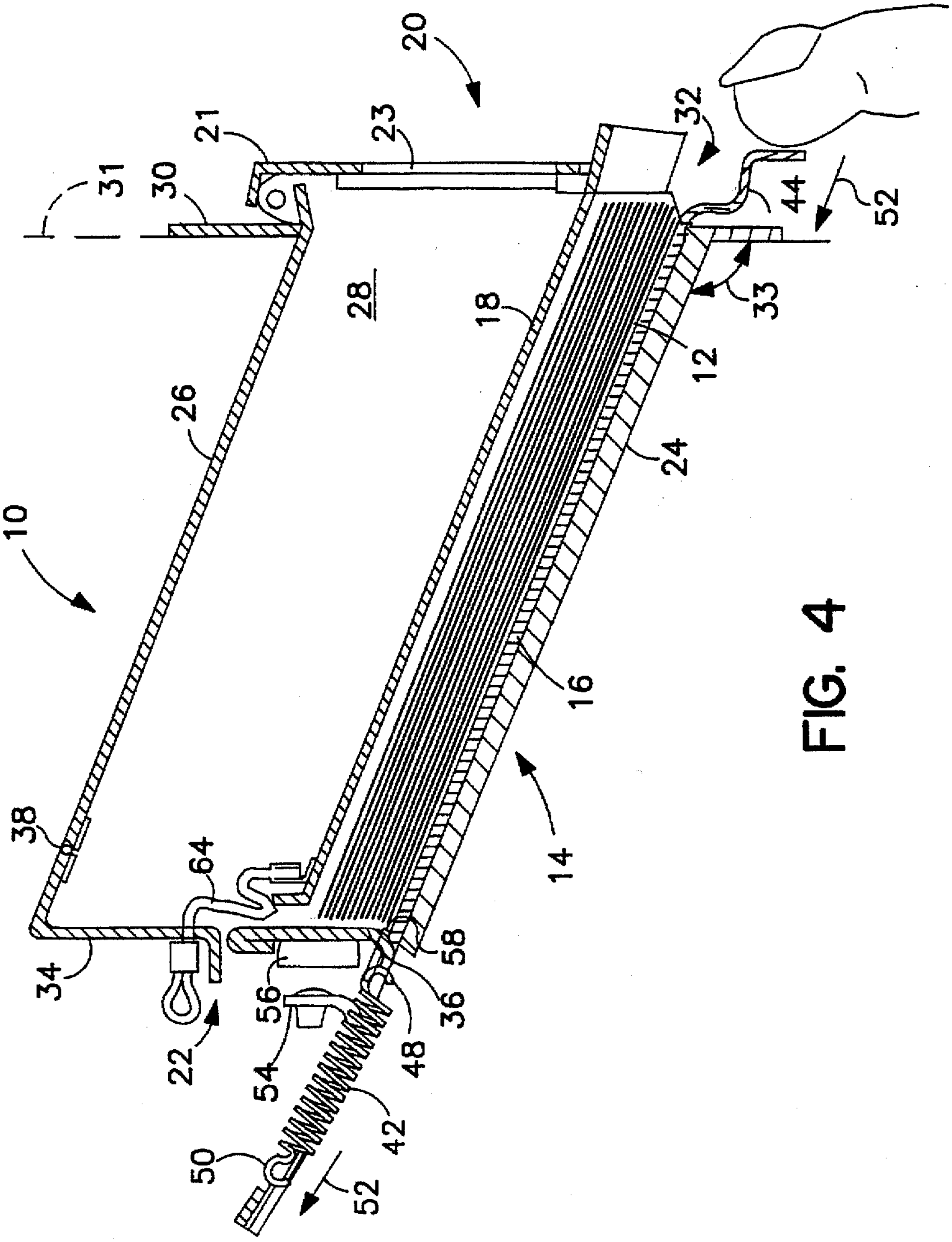
FIG. 4 is a transverse sectional view of the present invention showing a user pushing on the push tab to cause the material-dispensing plate to slide backward away from the front panel into a material acquiring-position so that a piece of material can fall down toward the bottom panel to position the piece of material between the ledge and the front panel.
Figure 5:
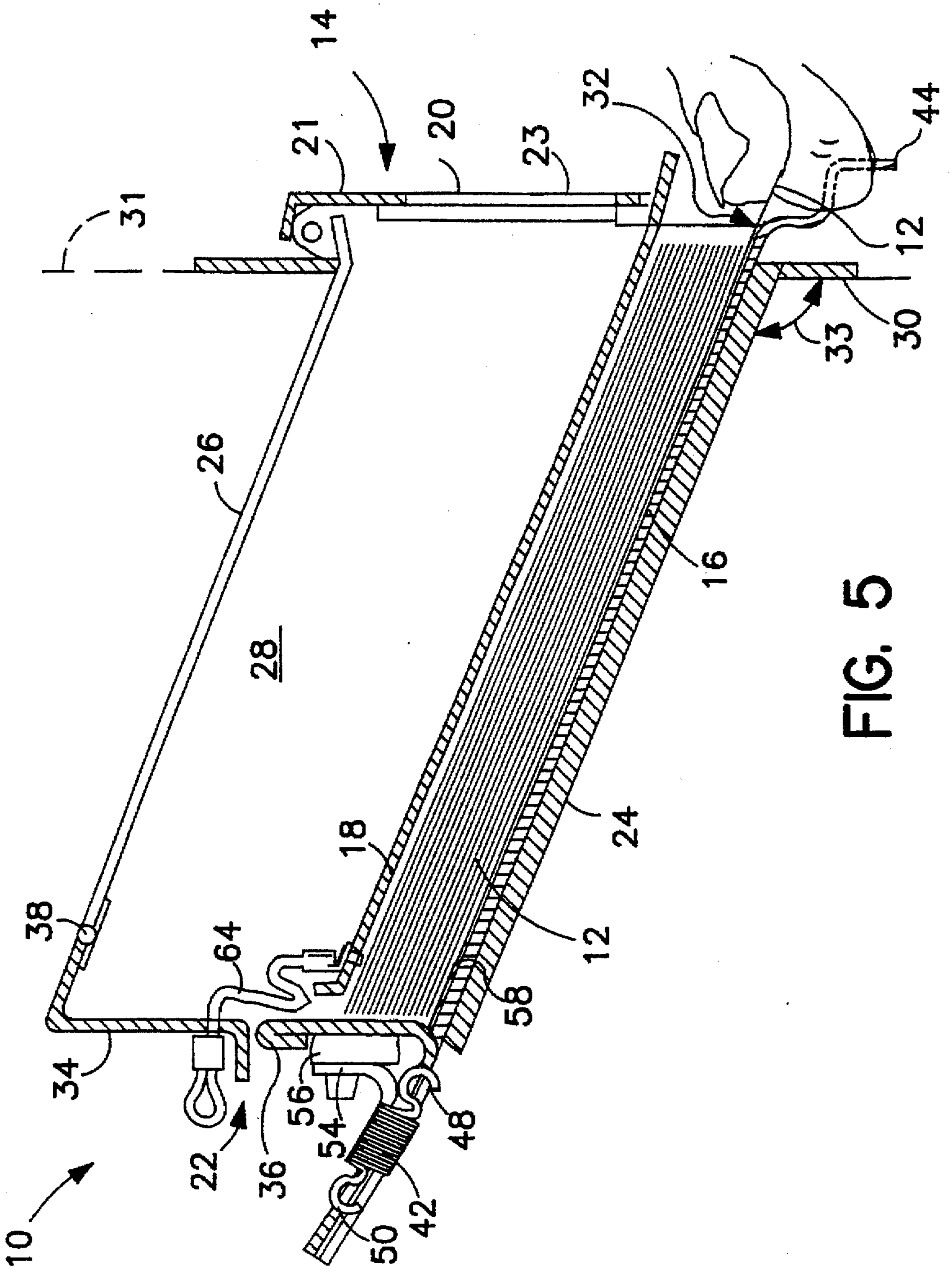
FIG. 5 is a transverse sectional view of the present invention showing the user releasing the push tab causing the material-dispensing plate to move forward toward the front panel into a material-dispensing position so that the piece of material situated between the ledge and the front panel moves forward through a material-dispensing aperture formed in the front panel to allow the user to obtain the piece of material.

A material dispenser according to the present invention is shown in FIG. 1. The material dispenser is loaded with materials, as shown in FIG. 3, and dispenses the materials 12 to a user when needed as shown in FIGS. 4 and 5.

The material dispenser 10 includes a housing 14 used to hold the materials 12, a material-dispensing plate 16 situated in the housing 14, and a movable weight 18 situated in the housing 14 to assist in dispensing the materials 12. The material-dispensing plate 16 acquires materials 12 held in the housing 14 and distributes the materials 12 to a user when needed.

The housing 14 includes a front panel 20, a back panel 22 spaced apart from the front panel 20, a bottom panel 24 extending between the front panel 20 and the back panel 22, a top panel 26 extending between the front panel 20 and the back panel 22 and spaced apart from the bottom panel 24, and spaced-apart side panels 28 each extending between the front panel 20, back panel 22, bottom panel 24, and top panel 26. The materials 12 are held within these panels 20, 22, 24, 26, 28 until they are dispensed.

Figure 2:
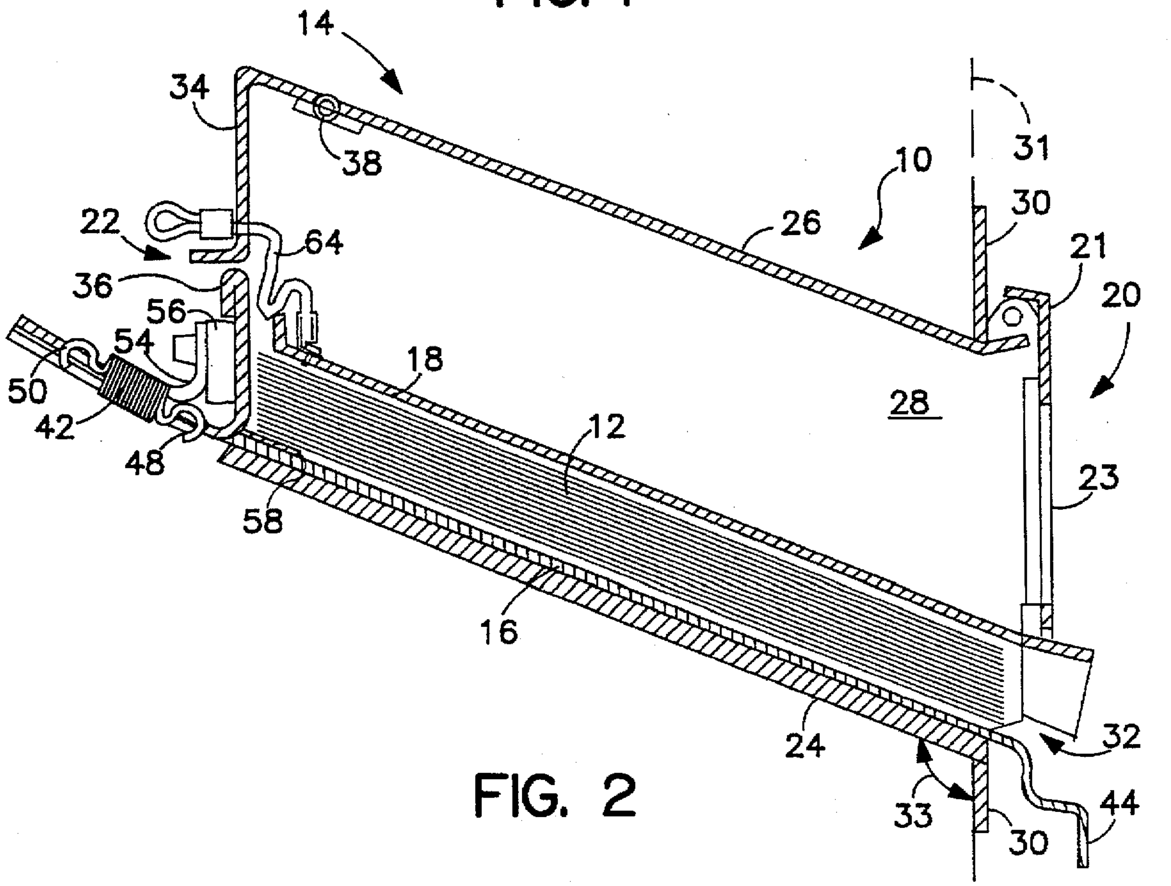
FIG. 2 is a transverse sectional view of the present invention showing the materials situated between a bottom panel of the housing and a movable weight, a material-dispensing plate situated within the housing between the materials and the bottom panel of the housing, a push tab appended to the material-dispensing plate and situated below the front panel, and a ledge appended to the material-dispensing plate and having a height equal to the thickness of a single piece of material.

The housing 14 further includes a mounting plate 30 situated adjacent to the front panel 20. The mounting plate 30 may mount up against a wall or structure 31 so that the front panel 20 is the only portion of the material dispenser 10 accessible as shown in FIGS. 2, 4, and 5.

The front panel 20 is formed to include a material-dispensing aperture 32 formed in the front panel 20 through which materials 12 are dispensed as shown in FIG. 5. The front panel 20 also includes a door 21 which can open to permit a user to load materials 12 into the housing 14. The door 21 includes a window 23 through which a user can see into the housing 14 to determine how many pieces of material 12 are remaining in the housing 14.

The mounting plate 30 is oriented parallel relative to the wall 31. The bottom panel 24 is oriented at an angle 33 relative to the mounting plate 30 and wall 31 so that the materials 12 slide down toward the material-dispensing aperture 32 more easily.

The back panel 22 is divided into a top portion 34 and a bottom portion 36. The top portion 34 of back panel 22 is appended to top panel 26 by a hinge 38. Because of the hinged connection 38, the top portion 34 of the back panel 22 is allowed to swing upwardly in direction 40 as shown in FIG. 3. When the top portion 34 of the back panel 22 is tilted up as shown in FIG. 3, materials 12 may be loaded into the housing 14.

In the illustrated embodiment of the present invention, materials 12 may be loaded into the housing 14 through either the front panel 20 or back panel 22. In alternative embodiments of the present invention, materials 12 may be loaded into the housing in any manner through an aperture formed in any portion of the housing.

The material-dispensing plate 16 is appended to the housing 14 by a spring 42 situated outside of the housing 14 near the back panel 22. The spring 42 includes a first end 48 facing toward the back panel 22 and the front panel 20 and a second end 50 facing away from the front panel 20 and the back panel 22. The first end 48 of the spring 42 is appended to the bottom portion 36 of the back panel 22 and the second end 50 of the spring 42 is appended to the material-dispensing plate 16.

A push tab 44 is appended to the material-dispensing plate 16 as shown in FIGS. 1, 2, 4, and 5. The push tab 44 is situated adjacent to the front panel 20. When a user needs a piece of material 12, he must merely push on the push tab 44 for a piece of material 12 to be dispensed through the material-dispensing aperture 32.

The material dispenser 10 is shown in an inactive position in FIG. 2. When a user pushes on the push tab 44 in direction 52, the material-dispensing plate 16 moves backward away from the front panel 20 in the same direction 52 to put the material-dispensing plate 16 in a material-acquiring position as shown in FIG. 4. Movement of the material-dispensing plate 16 in direction 52 causes the spring 42 to expand. Upon release of the push tab 44 by the user, the spring 42 contracts causing the material-dispensing plate 16 to move forward toward front panel 20 until it reaches the material-dispensing position as shown in FIG. 5. A bracket 54 appended to the material-dispensing plate 16 and a cushion 56 attached to the bottom portion 36 of the back panel 22 provide a positive stop for the material-dispensing plate 16 when it is moving forward toward the front panel 20.

The material-dispensing plate 16 includes a top side 60 facing away from the bottom panel 24 of the housing 14 and a bottom side 62 adjoining the bottom panel 24. The top side 60 is formed to include a ledge 58 situated near the back panel 22. The ledge 58 has a height equal to the height of one piece of material 12. When material-dispensing plate 16 is in the material-dispensing position, the ledge 58 is situated underneath the stack of materials 12 held in the housing 14. When the user pushes on the push tab 44 to situate the material-dispensing plate 16 in the material-acquiring position, the material-dispensing plate 16 moves far enough in direction 52 so that the piece of material 12 on the bottom of the stack is positioned in between the ledge 58 and the front panel 20. When the user releases the push tab 44 to move the material-dispensing plate 16 to its material-dispensing position, the ledge 58 "grabs" the piece of material 12 on the bottom of the stack and forces it through the material-dispensing aperture 32 formed in the front panel 20.

In the illustrated embodiment of the present invention, the ledge 58 has a height equal to the thickness of one envelope 12 that is to be dispensed. However, in alternative embodiments of the present invention, the ledge could have a height equal to the height of any type of material held within the housing that is to be dispensed. Also in alternative embodiments of the present invention, the ledge could have a height so that multiple envelopes or other pieces of material would be dispensed each time the push tab is pushed. In addition, in alternative embodiments of the present invention, the ledge may be a separate element appended to the material-dispensing plate.

The process of a user acquiring a piece of material 12 out of the material dispenser 10 is illustrated in FIGS. 4 and 5. To acquire a piece of material 12, a user must merely push on and let go of the push tab 44 and then grab the piece of material 12 that is dispensed through the material-dispensing aperture 32 of the front panel 20.

When a user pushes the push tab 44 in direction 52, the material-dispensing plate 16 moves backward away from the front panel 20 in direction 52 to the material-acquiring position. The backward movement of the material-dispensing plate 16 causes the ledge 58 to move backward away from the front panel 20 so that a piece of material 12 is positioned between the ledge 58 and the front panel 20. The backward movement of the material-dispensing plate 16 also causes the spring 42 to expand.

When the user releases the push tab 44, the spring 42 contracts causing the material-dispensing plate 16 to move forward toward the front panel 20 to the material-dispensing position. The forward movement of the material-dispensing plate 16 causes the piece of material 12, that was positioned between the ledge 58 and the front panel 20, to be dispensed through the material-dispensing aperture 32 as shown in FIG. 5. Once the piece of material 12 is dispensed through the material-dispensing aperture 32, a user may easily acquire the piece of material 12.

The movable weight 18 is positioned within the housing 14 and is appended to the top portion 34 of the back panel 22 by a string 64. The movable weight 18 assists the piece of material 12 on the bottom of the stack in being pushed downward toward the bottom panel 24 when the material-dispensing plate 16 has been moved backwardly away from the front panel 20 into the material-acquiring position so that the piece of material 20 can be positioned in between the ledge 58 and the front panel 20. When the top portion 34 of the back panel 22 is lifted up to load materials 12 into the housing 14, the movable weight 18 is also lifted up to permit the materials 12 to be loaded into the housing 14 between the movable weight 18 and the material-dispensing plate 16.

Although this invention has been described in detail to reference to certain embodiments, variations and modifications exist within the scope and spirit of the invention as described and as defined in the following claims.

I claim:

1. A material dispenser comprising:
   a first panel for supporting pieces of material,
   a second panel appended to the first panel, the second panel being formed to include a material-dispensing aperture to permit a piece of material to pass through the second panel,
   a material-dispensing plate situated on the first panel and having a material-acquiring position and a material-dispensing position,
   a ledge appended to the material-dispensing plate and situated under the material when the material-dispensing plate is in the material-dispensing position and behind the material when the material-dispensing plate is in the material-acquiring position,
   a push tab appended to the material-dispensing plate, and
   a spring appended to the material-dispensing plate so that when the push tab is pushed, the material-dispensing plate moves backward away from the second panel to its material-acquiring position to permit a bottom piece of material to fall down toward the first panel so that the piece of material is positioned between the ledge and second panel, and when the push tab is released the material-dispensing plate is biased forward by the spring toward the second panel so that the piece of material fixed between the ledge and second panel is pushed through the material-dispensing aperture formed in the second panel, wherein the first panel is a bottom panel and the second panel is a front panel of a housing, the housing further including a top panel appended to the front panel and situated in spaced apart confronting relation to the bottom panel and a back panel situated in spaced apart confronting relation to the front panel and pivotally coupled to the top panel to permit access into the housing through the back panel.

2. The material dispenser of claim 1, wherein the first panel is oriented at an angle relative to the second panel so that the first panel is inclined downwardly toward the second panel.

3. The material dispenser of claim 1, wherein the ledge has a height substantially equal to the thickness of the material to be dispensed.

4. The material dispenser of claim 1, wherein the material-dispensing plate is formed to include the ledge.

5. A material dispenser comprising:
   a first panel for supporting pieces of material,
   a second panel appended to the first panel, the second panel being formed to include a material-dispensing aperture to permit a piece of material to pass through the second panel,
   a material-dispensing plate situated on the first panel and having a material-acquiring position and a material-dispensing position,
   a ledge appended to the material-dispensing plate and situated under the material when the material-dispensing plate is in the material-dispensing position and behind the material when the material-dispensing plate is in the material-acquiring position,
   a push tab appended to the material-dispensing plate,
   a spring appended to the material-dispensing plate so that when the push tab is pushed, the material-dispensing plate moves backward away from the second panel to its material-acquiring position to permit a bottom piece of material to fall down toward the first panel so that the piece of material is positioned between the ledge and second panel, and when the push tab is released the material-dispensing plate is biased forward by the spring toward the second panel so that the piece of material fixed between the ledge and second panel is pushed through the material-dispensing aperture formed in the second panel, and
   a movable weight arranged to lie on top of the material to force the bottom piece of material to fall down toward the first plate when the material-dispensing plate is in its material-acquiring position, wherein the first panel is a bottom panel and the second panel is a front panel of a housing, the housing further includes a back panel appended to the bottom panel and situated in spaced apart confronting relation to the front panel, the movable weight being appended to the back panel.

6. The material dispenser of claim 5, wherein the housing further includes a top panel appended to the front panel and situated in spaced apart confronting relation to the bottom panel and spaced-apart first and second side panels appended to the bottom panel and situated to lie in spaced apart confronting relation to one another, the back panel includes a bottom portion appended to the first and second side panels and a top portion appended to the top panel, and the movable weight is fixed to the top portion of the back panel.

7. A material dispenser comprising:
   a first panel for supporting pieces of material,
   a second panel appended to the first panel, the second panel being formed to include a material-dispensing aperture to permit a piece of material to pass through the second panel,
   a material-dispensing plate situated on the first panel and having a material-acquiring position and a material-dispensing position,
   a ledge appended to the material-dispensing plate and situated under the material when the material-dispensing plate is in the material-dispensing position and behind the material when the material-dispensing plate is in the material-acquiring position,
   a push tab appended to the material-dispensing plate, and
   a spring appended to the material-dispensing plate so that when the push tab is pushed, the material-dispensing plate moves backward away from the second panel to its material-acquiring position to permit a bottom piece of material to fall down toward the first panel so that the piece of material is positioned between the ledge and second panel, and when the push tab is released the material-dispensing plate is biased forward by the spring toward the second panel so that the piece of material fixed between the ledge and second panel is pushed through the material-dispensing aperture formed in the second panel, the material-dispensing plate extending through the material-dispensing aperture formed in the second panel and being appended to the push tab at a location adjacent to the second panel.

8. The material dispenser of claim 7, wherein the push tab is situated below the material-dispensing aperture adjacent to the first panel.

9. The material dispenser of claim 7, wherein the material-dispensing plate includes two spaced-apart push tabs.

10. A material dispenser comprising:
   a first panel for supporting pieces of material, a second panel appended to the first panel, the second panel being formed to include a material-dispensing aperture to permit a piece of material to pass through the second panel, a material-dispensing plate situated on the first panel and having a material-acquiring position and a material-dispensing position, a ledge appended to the material-dispensing plate and situated under the material when the material-dispensing plate is in the material-dispensing position and behind the material when the material-dispensing plate is in the material-acquiring position, a push tab appended to the material-dispensing plate, and a spring appended to the material-dispensing plate so that when the push tab is pushed, the material-dispensing plate moves backward away from the second panel to its material-acquiring position to permit a bottom piece of material to fall down toward the first panel so that the piece of material is positioned between the ledge and second panel, and when the push tab is released the material-dispensing plate is biased forward by the spring toward the second panel so that the piece of material fixed between the ledge and second panel is pushed through the material-dispensing aperture formed in the second panel, wherein the first panel is a bottom panel and the second panel is a front panel of a housing, the housing further including a back panel appended to the bottom plate and situated in spaced apart confronting relation to the front panel, the spring being appended to the back panel of the housing.

11. The material dispenser of claim 10, wherein the housing further includes spaced-apart first and second side panels appended to the bottom panel and situated to lie in spaced apart confronting relation to one another, the back panel includes a bottom portion appended to the first and second side panels and a top portion appended to the top panel, and the spring is fixed to the bottom portion of the back panel.

12. A material dispenser comprising:

a first panel for supporting pieces of material, a second panel appended to the first panel, the second panel being formed to include a material-dispensing aperture to permit a piece of material to pass through the second panel, a mounting plate for mounting the first and second panels to a structure, a material-dispensing plate situated on the first panel and having a material-acquiring position and a material-dispensing position, a ledge appended to the material-dispensing plate and situated under the material when the material-dispensing plate is in the material-dispensing position and behind the material when the material-dispensing plate is in the material-acquiring position, a push tab appended to the material-dispensing plate, and a spring appended to the material-dispensing plate so that when the push tab is pushed, the material-dispensing plate moves backward away from the second panel to its material-acquiring position to permit a bottom piece of material to fall down toward the first panel so that the piece of material is positioned between the ledge and second panel, and when the push tab is released the material-dispensing plate is biased forward by the spring toward the second panel so that the piece of material fixed between the ledge and second panel is pushed through the material-dispensing aperture formed in the second panel, wherein the first panel is a bottom panel and the second panel is a front panel of a housing, the housing further including a back panel appended to the bottom panel and situated in spaced apart confronting relation to the front panel, the material-dispensing plate being oriented at an angle relative to the mounting plate so that the material-dispensing plate is inclined downwardly from the back panel to the front panel.

13. A material dispenser comprising:

a first panel for supporting pieces of material, a second panel appended to the first panel, the second panel being formed to include a material-dispensing aperture to permit a piece of material to pass through the second panel, a material-dispensing plate situated on the first panel and having a material-acquiring position and a material-dispensing position, a ledge appended to the material-dispensing plate and situated under the material when the material-dispensing plate is in the material-dispensing position and behind the material when the material-dispensing plate is in the material-acquiring position, a push tab appended to the material-dispensing plate, and a spring appended to the material-dispensing plate so that when the push tab is pushed, the material-dispensing plate moves backward away from the second panel to its material-acquiring position to permit a bottom piece of material to fall down toward the first panel so that the piece of material is positioned between the ledge and second panel, and when the push tab is released the material-dispensing plate is biased forward by the spring toward the second panel so that the piece of material fixed between the ledge and second panel is pushed through the material-dispensing aperture formed in the second panel, wherein the first panel is a bottom panel and the second panel is a front panel of a housing, the housing further including a top panel appended to the front panel and situated in spaced apart confronting relation to the bottom panel, a back panel appended to the top panel and situated in spaced apart confronting relation to the front panel, and first and second side panels appended to the bottom panel, top panel, front panel, and back panel and situated to lie in spaced apart confronting relation to one another, the bottom panel including a top side facing toward the top panel and a bottom side facing away from the top panel.

14. The material dispenser of claim 13, wherein the material-dispensing plate is situated on the top side of the bottom panel of the housing.

15. The material dispenser of claim 13, wherein the material-dispensing plate is situated adjacent to the back panel in the material-acquiring position.

16. The material dispenser of claim 13, wherein the ledge of the material-dispensing plate is situated adjacent to the back panel in the material-acquiring position.

* * * * *